Feb. 27, 1962 L. F. DAMAN 3,022,576
PORTABLE CUTTING TOOL
Filed March 31, 1961 2 Sheets-Sheet 1

INVENTOR.
LOUIS F. DAMAN
BY
Marshall J. Breen
ATTORNEY

WITNESS
Nicholas Leszczak

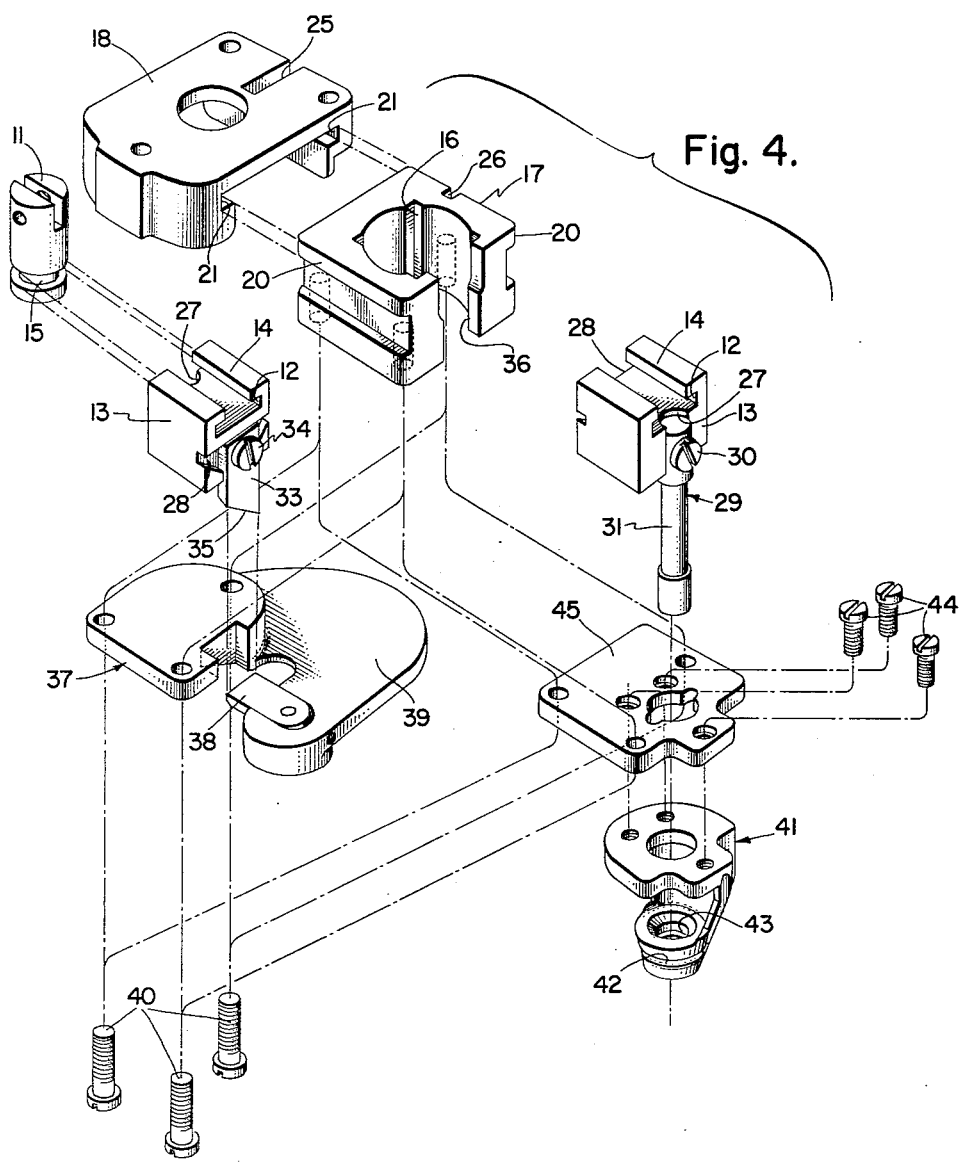

United States Patent Office 3,022,576
Patented Feb. 27, 1962

3,022,576
PORTABLE CUTTING TOOL
Louis F. Daman, Martinsville, N.J., assignor to The Singer Manufacturing Company, Elizabeth, N.J., a corporation of New Jersey
Filed Mar. 31, 1961, Ser. No. 99,884
3 Claims. (Cl. 30—241)

The present invention relates to portable cutting tools and particularly to such a tool designed for use in cutting sheet material.

The object of this invention is to provide a portable cutting tool which is adapted to be quickly, easily and economically converted from a shear-type cutter to a nibbler or punch-type cutter.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

FIG. 4 is an exploded perspective view of the elements of both the punch-type and shear-type cutters.

Figure 1:
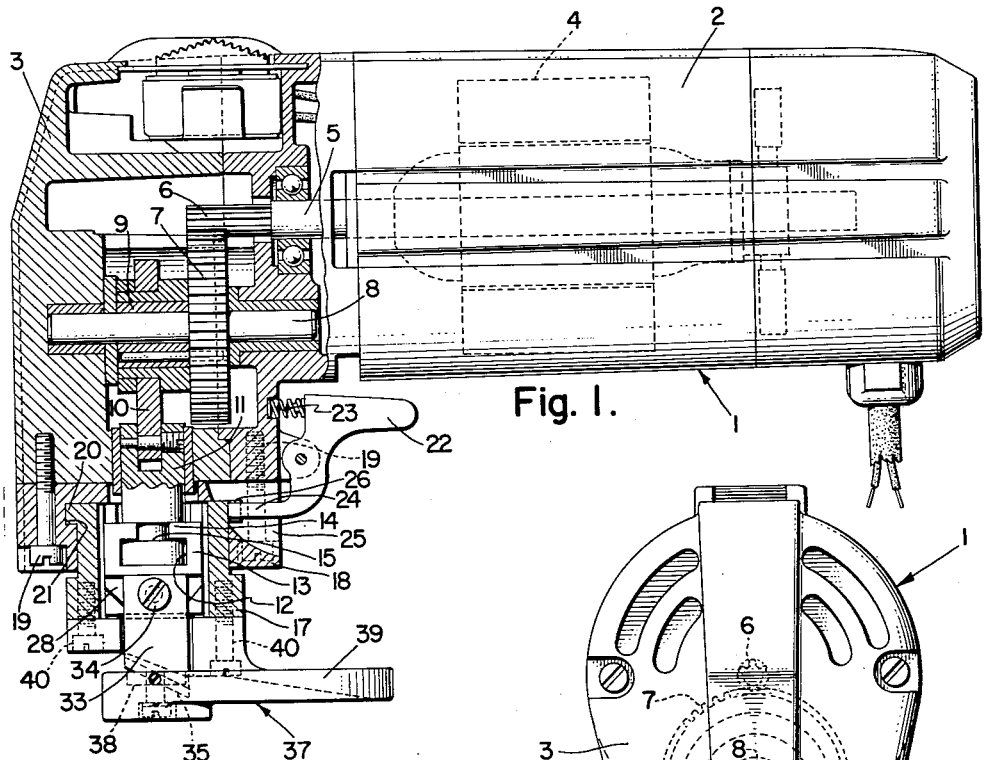
FIG. 1 is a front elevational view partly in section of a portable cutting tool constructed in accordance with this invention.
Figure 2:
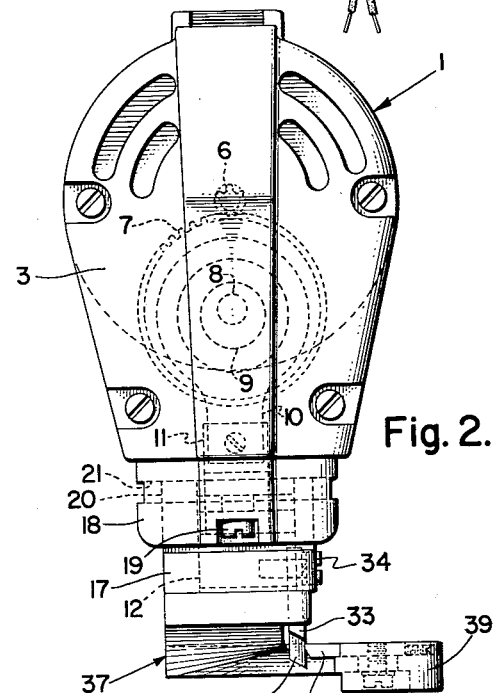
FIG. 2 is a head end elevational view of the device of FIG. 1.
Figure 3:
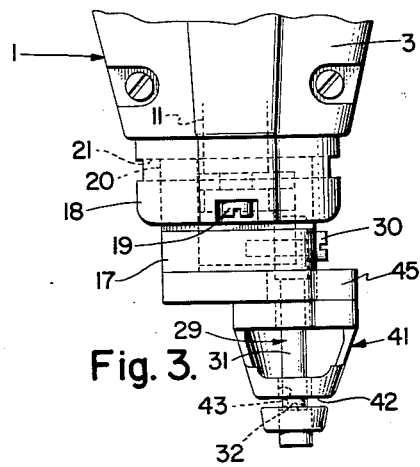
FIG. 3 is a fragmentary head end elevational view similar to FIG. 2 but with the punch-type cutter in place of the shear-type cutter.

With reference to the drawings, there is illustrated a portable cutting tool having a housing 1 including a hand portion 2 and a head 3. An electric motor 4 is mounted within the hand portion 2 and includes a drive shaft 5 extending into the head 3 and having a splined end 6 that meshes with a gear 7 mounted on a shaft 8 journaled in the head 3 on an axis parallel to the axis of the shaft 5. An eccentric 9 is secured for rotation with the shaft 8 and is connected through a link 10 to a bar 11 mounted for reciprocation in the head 3.

The lower end of the bar 11 extends into a slot 12 in the upper face of a substantially square slide block 13 and is connected to the same by tongues 14 on the slide block that are received within a peripheral groove 15 of the bar. The slide block 13 is thus keyed to the bar 11 for unitary reciprocation and is adapted to be separated therefrom by movement of the slide block laterally of the bar.

The slide block 13 is mounted for reciprocation in a slideway 16 in a bracket 17 that is adapted to be secured to the bottom of the head 3 by means of a mounting plate 18 secured to the head by screws 19 and connected to the bracket 17 by a tongue and groove connection including tongues 20 on the bracket 17 that slide into grooves 21 in the mounting plate 18. The tongue and groove connection 20—21 is aligned with the tongue and groove connection 14—15 so that the bracket 17 is held against movement relatively to the head 3 in a direction axially of the bar 11, but can be moved laterally of the head 3 to disengage simultaneously the slide block 13 from the bar 11 and the bracket 17 from the mounting plate 18. The bracket 17 is releasably held in operative position with respect to the mounting plate 18 by a latch 22 pivotally mounted on the head 3 and biased by a spring 23 to pass a latch finger 24 through a slot 25 in the mounting plate 18 and into a notch 26 in the tongue 20 of the bracket 17.

The slide block 13 is reversible in the guideway 16 of the bracket 17 and has seating surfaces 27 and 28 formed in opposed faces thereof. The seating surface 27 receives a nibbler or punch-type cutter 29 secured by a screw 30 and having a reduced shank 31 and cutting edge 32. The seating surface 28 receives a shear-type cutter 33 secured by a screw 34 and having a cutting edge 35. The cutters 29 and 33 are used alternatively. The bracket 17 has a slot 36 in the front thereof to accommodate the screw 30 or 34.

The shear-type cutter 33 cooperates with a ledger element 37 having a ledger blade 38 carried by an arm 39 secured by screws 40 to the bottom of the bracket 17. The nibbler or punch-type cutter 29 cooperates with a ledger element 41 having a slot 42 that receives the material to be cut and a cutting edge 43 against which the cutting edge 32 cooperates on the upstroke of the bar 11 to remove a crescent-shaped section of the material. The ledger element 41 is secured by screws 44 to an adapter plate 45 that is in turn secured by the screws 40 to the bracket 17 in place of the ledger element 37.

Numerous alterations of the structure herein disclosed will suggest themselves to those skilled in the art. However, it is to be understood that the present disclosure relates to a preferred embodiment of my invention which is for purposes of illustration only and not to be construed as a limitation of the invention. All such modifications which do not depart from the spirit of the invention are intended to be included within the scope of the appended claims.

Having thus set forth the nature of the invention, what I claim herein is:

1. A portable cutting tool comprising a housing having a bar mounted therein for reciprocation and means for imparting reciprocation thereto, a slide block, means for connecting said slide block to said bar for unitary reciprocation and providing for lateral movement of said slide block to effect separation of said bar and slide block, a bracket having a guideway receiving said slide block and providing for movement of said slide block therein in a direction axially of said bar and holding said slide block against lateral moveemnt relatively to said bar, means for connecting said bracket to said housing to prevent movement of said bracket relatively to said housing in the direction axially of said bar and providing for lateral movement in a direction coinciding with the direction of lateral movement of said slide block for effecting disconnection of said slide block from said bar, means for releasably securing said bracket to said housing in operative position with the guideway in said bracket aligned axially with said bar, a cutter carried by said slide block, and a ledger carried by said bracket.

2. A portable cutting tool in accordance with claim 1 in which said means for connecting said slide block to said bar and said means for connecting said bracket to said housing comprise tongue and groove connections.

3. A portable cutting tool in accordance with claim 1 in which said slide block is reversible in said bracket and is provided upon opposed sides with seating surfaces for receiving respectively a punch-type cutter and a shear-type cutter.

No references cited.